No. 787,319. PATENTED APR. 11, 1905.
L. WILSON.
PROTECTIVE DEVICE FOR ELECTRIC APPARATUS.
APPLICATION FILED MAY 12, 1904.
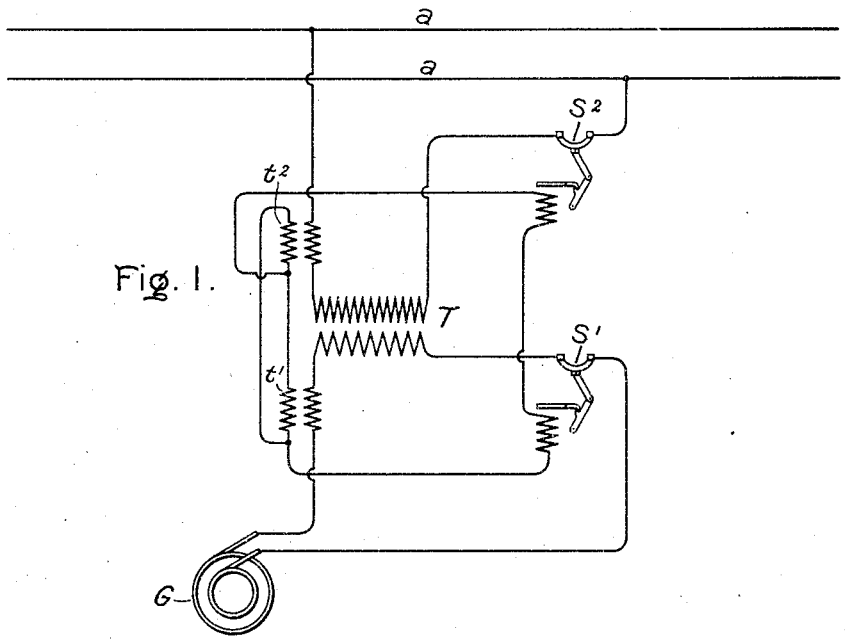
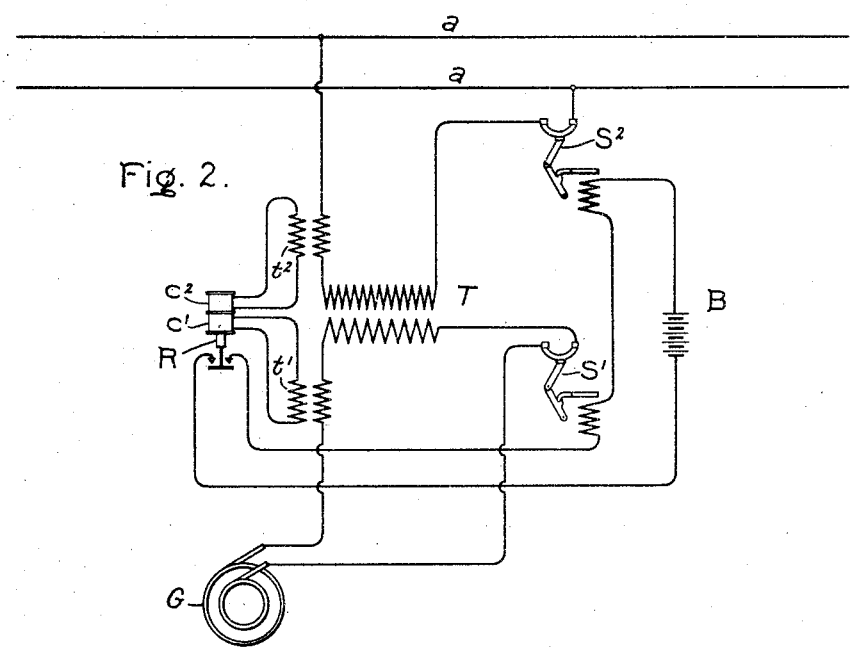
Witnesses:
George W. Tilden.
Helen Oxford.
Inventor:
Leonard Wilson,
by Allen A. Davis
Att'y.

No. 787,319.                                                                 Patented April 11, 1905.

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

PROTECTIVE DEVICE FOR ELECTRIC APPARATUS.

SPECIFICATION forming part of Letters Patent No. 787,319, dated April 11, 1905.

Application filed May 12, 1904. Serial No. 207,689.

*To all whom it may concern:*

Be it known that I, LEONARD WILSON, a subject of the King of Great Britain, residing at Pittsfield, county of Berkshire, State of Massachusetts, have invented certain new and useful Improvements in Protective Devices for Electric Apparatus, of which the following is a specification.

My invention relates to the protection of electrical apparatus, and has particular reference to the protection of apparatus—such as transformers, switches, and bus-bars—which transmit electrical energy, as distinguished from such apparatus, as generators or motors, which generate or absorb electrical energy.

In transmitting apparatus—such as transformers, switches, &c.—the current input bears a fixed ratio to the current leaving the apparatus, this ratio being unity in the case of switches and bus-bars and in the case of transformers depending upon the ratio of transformation of the windings. As long as the apparatus is in normal condition this ratio remains fixed; but if a short circuit occurs within the apparatus itself energy will be consumed by the apparatus and the ratio of current input to output will be altered or unbalanced.

The object of my invention is to protect such apparatus against internal short circuits; and my invention consists in utilizing the change in the input and output ratio which occurs upon a short circuit in order to secure the desired protection. My invention thus presents the advantage not only of absolute protection against internal short circuits, but also that the apparatus is not cut out of circuit upon the occurrence of an overload, such as it may frequently be desirable that the apparatus should carry without producing interruption of the service.

My invention will best be understood from the accompanying drawings, in which—

Figure 1 shows diagrammatically an arrangement for protecting a transformer from an internal short circuit in accordance with my invention, and Fig. 2 shows a modification of the same.

Although I have illustrated and shall describe my invention as applied to the protection of a transformer, it will be understood that my invention is applicable to the protection of many other transmitting devices.

In the drawings, G represents an alternating-current generator connected to the primary winding of a transformer T, the secondary of which is connected to the bus-bars $a\ a$, to which other transformers supplied from other generators may or may not be connected.

$S'$ represents a switch in the circuit of the primary winding of transformer T, and $S^2$ represents a second switch in the circuit of the secondary winding.

$t'$ represents a series transformer having its primary in circuit with the primary winding of transformer T.

$t^2$ represents a similar transformer in series with the secondary winding. The secondaries of transformers $t'$ and $t^2$ are connected in series, and the tripping-coils of the switches $S'$ and $S^2$ are connected in shunt to the secondaries of both series transformers. Transformers $t'$ and $t^2$ are so proportioned that when the currents in the two windings of transformer T bear their normal ratio to each other the currents in their secondaries are equal, and the secondaries are so connected that their electromotive forces are in series in the closed circuit formed by the two secondaries. Consequently as long as the normal current ratio continues in the windings of transformer T all of the current induced in the secondary of each series transformer will flow through the secondary of the other series transformer and no current will flow through the tripping-coils of the switches.

Now if a few turns of one of the windings of transformer T becomes short-circuited a part of the energy supplied by the generator G will be consumed in the short circuit and the amount of energy delivered to the bus-bars $a\ a$ will be reduced. If the internal short circuit is or sufficient amount, a reversal of current will be produced in the secondary leads of transformer T and current will flow from the bus-bars $a$ $a$ to the secondary transformer T if other sources of energy are connected to the bus-bars. Whether the internal short circuit in transformer T is merely sufficient to reduce the amount of energy supplied by the transformer T to the bus-bars or whether it is sufficiently great to produce a reversal of current in the secondary circuit the ratio of current in the two windings of transformer T will be altered and the current through the secondaries of the two series transformers will no longer be the same. The difference in these two currents will consequently flow through the tripping-coils of switches S' and S², which will open the two switches, thereby disconnecting the transformer T from both generator and bus-bars. If the short circuit is of sufficient amount to produce a reversal of energy in the secondary circuit of transformer T, the electromotive forces in the two secondaries of the series transformers will be opposed and the sum of their currents will flow through the tripping-coils. In any case the current through the tripping-coils is equal to the algebraic difference of the currents in the two secondaries, and consequently the tripping-coils will always act to open the circuits of transformer T whenever the normal current ratio in the windings of transformer T is disturbed.

It is evident that the effects of the two series transformers $t'$ and $t^2$ may be combined magnetically instead of electrically. Also the currents produced in the secondaries may be utilized to operate a relay instead of being applied directly to operate the switches. Thus in Fig. 2 the currents from transformers $t'$ and $t^2$ are combined magnetically, the secondaries being connected to coils $c'$ and $c^2$, respectively, of the relay R. If the coils $c'$ and $c^2$ are properly connected, the currents therein will oppose each other and produce no resultant flux tending to close the relay. If, however, an unbalancing of the normal current-flow in the two windings of transformer T is produced by an internal short circuit, one of the coils $c'$ and $c^2$ will overpower the other and will draw up the armature of relay R, thereby closing a circuit from the battery or other source of current B through the tripping-coils of the switches S' and S².

As has been said heretofore, my invention is applicable to other transmitting devices than transformers. Furthermore, the arrangement and connections of the protection devices may be modified in many ways without departing from the spirit of my invention, and accordingly I aim in the appended claims to cover all such modifications which are within the spirit and scope of my invention.

What I claim as new, and desire to secure by Letters Patent of the United States, is—

1. In combination with current-transmitting apparatus, switches adapted to open the circuit thereof, means responsive to a change of the normal ratio of current input to output of said apparatus and adapted to operate said switches.

2. In combination with current-transmitting apparatus, switches adapted to open the circuits thereof, tripping-coils for said switches, and means for energizing said tripping-coils only upon a change of the normal ratio of current input to output of said apparatus.

3. In combination with alternating-current-transmitting apparatus, switches adapted to open the circuits of said apparatus, electroresponsive means adapted to operate said switches, and series transformers having their primaries connected in circuit with said apparatus on the receiving and delivering sides respectively and having their secondaries connected to said electroresponsive means, said transformers being adapted and connected to energize said means only upon a change of the normal ratio of current input to output of said device.

4. In combination with a transformer, switches adapted to open the circuits of the windings thereof, means responsive to a change of the normal ratio of the currents in the windings of said transformer and adapted to operate said switches.

5. In combination with a transformer, switches adapted to open the circuits of the windings thereof, tripping-coils for said switches, and means for energizing said tripping-coils only upon a change of the normal current ratio in said windings.

6. In combination with a transformer, switches adapted to open the circuits of the windings thereof, an electroresponsive device adapted to operate said switches, and series transformers each having its primary in series with one winding of said transformer and both transformers having their secondaries connected to said device, said transformers being adapted and arranged to energize said device only upon a change of the normal current ratio in said windings.

In witness whereof I have hereunto set my hand this 7th day of May, 1904.

LEONARD WILSON.

Witnesses:
J. R. ANDERSON,
H. M. ACLY.